US010017335B2

(12) United States Patent
Beressey et al.

(10) Patent No.: US 10,017,335 B2
(45) Date of Patent: *Jul. 10, 2018

(54) SYSTEM, METHOD AND APPARATUS FOR DESTACKING STACKED ARTICLES

(71) Applicant: Godiva Chocolatier, Inc., New York, NY (US)

(72) Inventors: Thierry Beressey, Yves-Gomezée (BE); Willy De Boeck, Merchtem (BE); Nicholas Louis Rozzi, Douglassville, PA (US)

(73) Assignee: Godiva Chocolatier, Inc., New York, NY (US)

( * ) Notice: Subject to any disclaimer, the term of this patent is extended or adjusted under 35 U.S.C. 154(b) by 519 days.

This patent is subject to a terminal disclaimer.

(21) Appl. No.: 14/696,930

(22) Filed: Apr. 27, 2015

(65) Prior Publication Data
US 2015/0284193 A1    Oct. 8, 2015

Related U.S. Application Data

(63) Continuation of application No. 13/768,071, filed on Feb. 15, 2013, now Pat. No. 9,017,008.

(51) Int. Cl.
*B65G 59/02* (2006.01)
*B65G 57/00* (2006.01)
*B65G 59/00* (2006.01)
*B65G 59/06* (2006.01)
*B65G 59/10* (2006.01)

(52) U.S. Cl.
CPC ............. *B65G 59/02* (2013.01); *B65G 57/00* (2013.01); *B65G 59/00* (2013.01); *B65G 59/062* (2013.01); *B65G 59/105* (2013.01)

(58) Field of Classification Search
CPC ...... B65G 59/00; B65G 59/02; B65G 59/062; B65G 59/105; B65G 57/00
USPC ............ 425/183, 524; 414/800, 794.5, 796.9
See application file for complete search history.

(56) References Cited

U.S. PATENT DOCUMENTS 2,403,466 A * 7/1946 Stutz .................... B21D 53/085
29/281.5
3,379,346 A * 4/1968 Frederick ................ B65B 43/44
221/221

(Continued)

*Primary Examiner* — Yogendra N Gupta
*Assistant Examiner* — Emmanuel S Luk
(74) *Attorney, Agent, or Firm* — Kelley Drye & Warren LLP

(57) ABSTRACT

A destacker for automatically destacking a plurality of vertically stacked articles that is particularly useful in destacking magnetic molds used in the chocolate manufacturing industry. Each article comprises at least one slanted notch. The destacker includes at least one hammer having a blade that moves from a retracted position to an extracted position, wherein at the extracted position the blade engages a gap formed by the slanted notch between the bottommost article and the article located above the bottommost article to release the bottommost article from the plurality of stacked articles. The bottommost article then drops onto a conveyor to be transported to the production line. The destacker further includes oppositely disposed pair of mold carriers and oppositely disposed pair of mold lockers that assist the destacker to feed the stack of molds in a downward direction.

20 Claims, 12 Drawing Sheets

(56) References Cited

U.S. PATENT DOCUMENTS

| | | | | |
|---|---|---|---|---|
| 3,477,592 A * | 11/1969 | Kuhlman | ............ | B65G 59/101 |
| | | | | 221/221 |
| 3,542,243 A * | 11/1970 | Stockdale | ............ | B65G 59/101 |
| | | | | 221/221 |
| 4,045,291 A * | 8/1977 | Berger | ................... | B01L 3/502 |
| | | | | 206/818 |
| 4,915,578 A * | 4/1990 | Becker | ................ | B65G 59/066 |
| | | | | 221/253 |
| 5,013,213 A * | 5/1991 | Roberts | ............... | B65G 59/106 |
| | | | | 198/409 |
| 6,881,380 B1 * | 4/2005 | Mootz | ................. | B65G 59/062 |
| | | | | 221/298 |
| 2006/0078414 A1 * | 4/2006 | Talken | ................... | B65H 29/50 |
| | | | | 414/794.5 |
| 2007/0081884 A1 * | 4/2007 | Monti | ................... | B65B 43/145 |
| | | | | 414/794.4 |
| 2008/0142416 A1 * | 6/2008 | Lawson | ............ | B29D 30/0016 |
| | | | | 209/629 |
| 2010/0147198 A1 * | 6/2010 | Palmer | ................ | B65D 19/004 |
| | | | | 108/53.3 |
| 2011/0045114 A1 * | 2/2011 | Whetstone, Jr. | ......... | A23G 1/21 |
| | | | | 425/183 |
| 2012/0076631 A1 * | 3/2012 | Wang | .................... | B65G 65/00 |
| | | | | 414/792.7 |

\* cited by examiner

SYSTEM, METHOD AND APPARATUS FOR DESTACKING STACKED ARTICLES

CROSS-REFERENCE TO RELATED APPLICATIONS

This application is a continuation of Non-Provisional application Ser. No. 13/768,071, filed Feb. 15, 2013, the entire contents thereof are herein incorporated by reference.

FIELD OF THE INVENTION

The present invention relates to the field of destacking machines in a production line, and more particularly, to a system, method, and apparatus for automatically destacking a plurality of vertically stacked articles. The present invention may destack articles used in various industries, but is particularly useful in destacking magnetic moulds used for manufacturing chocolate.

BACKGROUND OF THE INVENTION

On a commercial scale, chocolate candy is generally manufactured using moulds. A chocolate mould is usually made of plastic and includes one or more cavities for forming chocolates in desired shapes. Dark chocolate, milk chocolate, white chocolate and filled chocolates can all be manufactured using moulds. During manufacturing, tempered liquid chocolate is deposited into the moulds' cavities as the moulds move along a conveyor line. The filled moulds then pass through a variety of stations where the liquid chocolate is vibrated to remove trapped air, optional fillings are added, the chocolate is cooled, and other optional processes are applied. After chocolate candy is formed, the individual pieces are removed from the moulds, either automatically or by hand, and individually wrapped, assembled or otherwise packaged. Because the moulds have to undergo such a long and harsh process, the moulds have to be sturdy and well reinforced, particularly if they are made up of multiple parts.

Several types of moulds can be utilized in manufacturing chocolates. One type is an assembly mould. Assembly moulds, sometimes referred to as three dimensional moulds, allow for manufacturing fully shaped and decorated chocolates. Such moulds consist of multiple pieces that are assembled into a finished product.

Some assembly moulds are assembled during production. For example, an assembly mould, called a book mould, may be made up of two mould pieces, each containing cavities for forming half of a chocolate candy. During production, each mould piece is filled with chocolate and the two mould pieces are joined together when the chocolate is in a semi-hardened state, to form a three dimensional chocolate candy. Alternatively, chocolate may be poured into a pre-assembled assembly mould.

Assembly moulds are also utilized for manufacturing chocolates with printed designs or textures, using printed or textured transfer sheets. These moulds include a bottom mould piece on which a transfer sheet is placed. The transfer sheet is either printed with edible ink or contains a textured pattern thereon. A top mould piece formed with bottomless cavities is placed on top, such that the bottom of the cavities reveals the transfer sheet. As tempered chocolate is poured into the mould cavity, the design on the transfer sheet is transferred onto the chocolate while the chocolate is simultaneously formed into the desired shape.

The individual mould pieces of assembly moulds are generally held together by pins, but more recently, magnetic chocolate moulds were introduced. Magnetic chocolate moulds allow for a more firm and tight mould assembly, which can be quickly assembled and disassembled. To keep the mould pieces together, a significant number of magnets relative to the size of the mould are used.

As the moulds move along the production line during the production process, it is desired to stack the moulds and later destack or separate them. For example, when the moulds are initially assembled, they are typically vertically stacked into pallets by hand. However, the individual moulds in the stack of moulds must be separated before being fed onto the production line to be filled with chocolate. Moulds may also be stacked automatically at one of the production stations. For example, it may be beneficial to vertically stack already-filled moulds on the production line before they enter a cooling station where the chocolate is cooled. Upon exiting the cooling station, the stack of moulds must be destacked, or separated, so they can be fed into the remaining stations on the production line.

Conventionally, to destack the moulds, the stacked moulds are fed into the top of a destacking machine that automatically destacks the stacked moulds by simply dropping the bottommost moulds one at a time onto a conveyor. However, such machines are incapable of automatically destacking magnetic moulds. Typically due to the number and/or strength of the magnets, the bottommost magnetic mould assembly remains magnetized to the other mould assemblies and either does not drop onto the conveyor, or drops later than would be optimal, causing delays or completely stopping the production line. Unfortunately, the strength and number of magnets cannot be reduced without jeopardizing the quality of the mould assembly. As such, workers are used to individually place the magnetic mould assemblies on the conveyor, which is an expensive and time consuming process.

There is therefore a need for a system, method and apparatus for destacking magnetic moulds or similar articles that overcomes some or all of the previously delineated drawbacks of destacking machines and the associated known moulds.

SUMMARY OF THE INVENTION

An object of the present invention is to provide a destacking system, method and apparatus for a production line that overcomes some or all of the previously delineated drawbacks of known destacking machines.

Another object of the present invention is to provide a completely automated system, method and apparatus for destacking a plurality of vertically stacked articles.

Another object of the present invention is to provide a system, method and apparatus for automatically destacking a plurality of vertically stacked articles, wherein the production time and labor costs are less than for known systems.

Another object of the present invention is to provide a system, method and apparatus for destacking vertically stacked magnetic moulds or similar articles.

Another object of the invention is to provide a system, method and apparatus for automatically destacking moulds used in chocolate manufacturing and similar articles.

In one non-limiting aspect of the invention a destacker is provided for automatically destacking a plurality of vertically stacked articles, which is particularly useful in destacking magnetic moulds in the chocolate industry. Each article comprises at least one slanted notch. The destacker includes at least one hammer having a blade that moves from a retracted position to an extracted position, wherein at the extracted position the blade engages a gap formed by the slanted notch between the bottommost article and the article located above the bottommost article to release the bottommost article from the plurality of stacked articles. The bottommost article then drops onto a conveyor to be transported to the production line. The destacker further includes an oppositely-disposed pair of mould carriers and oppositely disposed pair of mould lockers that assist the destacker to feed the stack of moulds in a downward direction.

BRIEF DESCRIPTION OF THE DRAWINGS

A further understanding of the invention can be obtained by reference to a preferred embodiment set forth in the illustrations of the accompanying drawings. Although the illustrated embodiment is merely exemplary of systems, methods, and apparati for carrying out the invention, both the organization and method of operation of the invention, in general, together with further objectives and advantages thereof, may be more easily understood by reference to the drawings and the following description. The drawings are not intended to limit the scope of this invention, which is set forth with particularity in the claims as appended hereto or as subsequently amended, but merely to clarify and exemplify the invention.

For a more complete understanding of the invention, reference is now made to the following drawings in which.

DETAILED DESCRIPTION OF THE INVENTION

The invention may be understood more readily by reference to the following detailed description of a preferred embodiment of the invention. However, techniques, systems, and operating structures in accordance with the invention may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein, which define the scope of the invention. It must be noted that, as used in the specification and the appended claims, the singular forms "a", "an", and "the" include plural referents unless the context clearly indicates otherwise.

The destacking system, method, and apparatus of the present invention are described below with reference to destacking magnetic moulds used in the manufacture of chocolate, and particularly with reference to an assembly mould that uses a printed or textured transfer sheet. However, the present invention is not limited to be used with such a mould. The present invention may be used with any other types of moulds that need to be destacked, including other types of assembly moulds, book moulds, flat back moulds, cavity moulds, and the like. Additionally, the present invention is not limited to application in the chocolate manufacturing industry. It can be applied to any other industry and manufacturing processes where stacked articles need to be destacked or separated. The present invention may be utilized for destacking moulds used to manufacture many other types of products.

Figure 1:
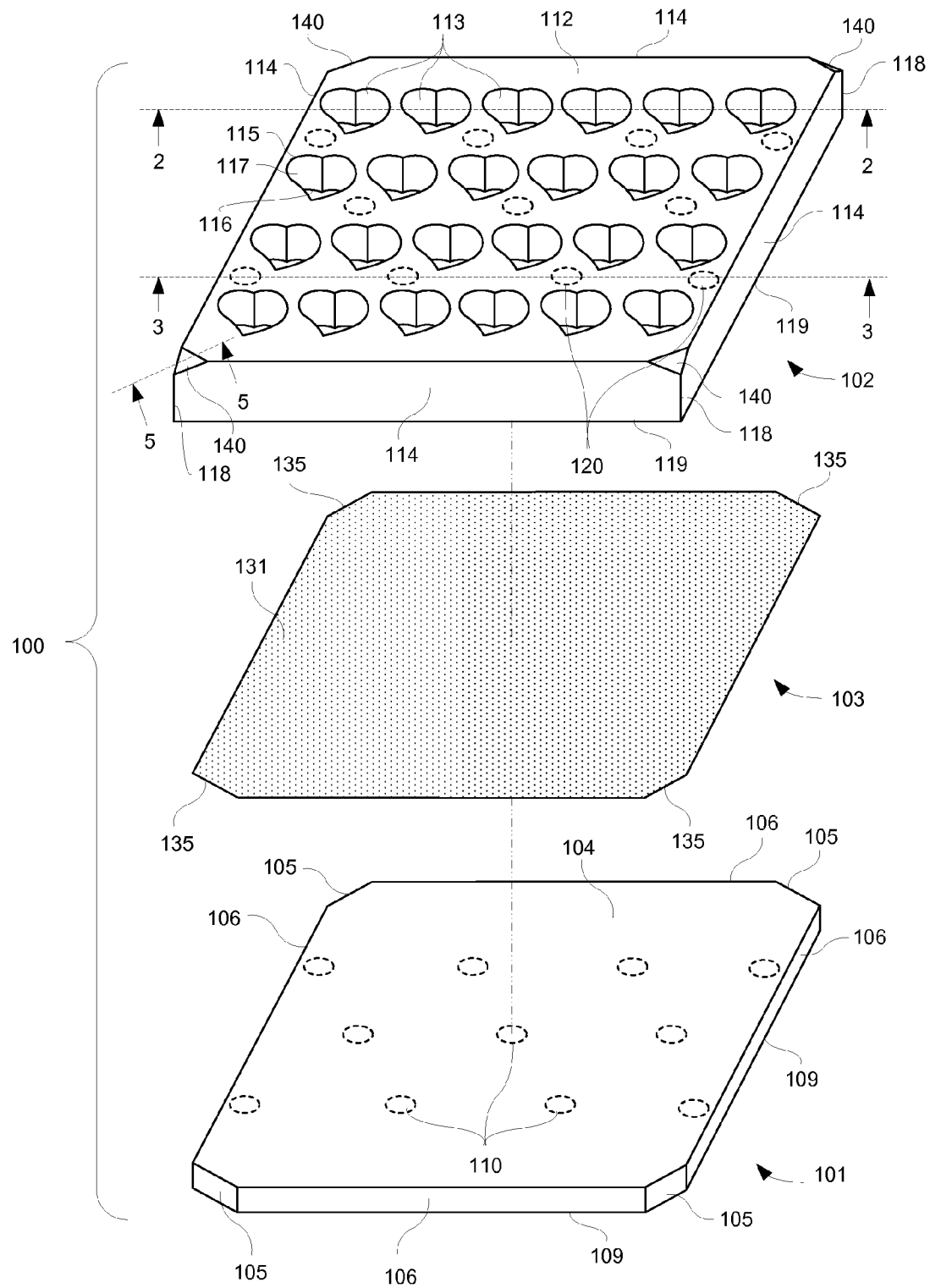
FIG. 1 is an exploded perspective view of a mould assembly.

Referring now to FIG. 1, there is shown an exploded perspective view of a mould assembly 100. Mould assembly 100 is used to manufacture chocolates or pralines which may optionally include printed designs or embossed textures. Mould assembly 100 comprises bottom mould piece 101 and top mould piece 102. Bottom mould piece 101 and top mould piece 102 are preferably made of plastic, and more preferably from rigid polycarbonate. However, any other material suitable for use may be utilized without departing from the scope of the present invention. In addition, bottom mould piece 101 and top mould piece 102 may be made of two separate materials. For example, bottom mould piece 101 and/or top mould piece 102 may be made of metal, rubber, silicone, resin, wood, or other materials. Mould pieces 101 and 102 are preferably rectangular, but may be made of any desired shape known in the art. For example, they may be square, circular, triangular, or any other polygonal shape, or they may simulate the shape of the final molded product.

Bottom mould piece 101 comprises a horizontal top wall 104 from which four vertical side walls 106 extend in a downward direction towards bottom edges 109. Bottom mould piece 101 also preferably contains vertical corner walls 105 to enable easy disassemble of the bottom mould piece 101 from the top mould piece 102. Bottom mould piece 101 also includes a plurality of magnets 110 disposed therein. The magnets are preferably located right underneath horizontal top wall 104, as shown in greater detail in FIG. 3. Any number of magnets may be utilized without departing from the scope of the present invention. Generally, the larger the mould, the greater number of magnets that will be required.

Top mould piece 102 contains a horizontal top wall 112 from which four vertical side walls 114 extend in a downward direction toward bottom edges 119. Top wall 112 contains a plurality of bottomless cavities 113 extending downwardly therefrom. Each cavity 113 is defined by a side wall 117 which extends from top end 115 towards bottom end 116. Preferably, side wall 117 tapers down from top end 115 to bottom end 116. Cavities 113 are shaped to form the desired final chocolate shape. Although heart shaped cavities are shown, any shape known in the art may be used, including but not limited to circles, triangles, ovals, squares, silhouettes of animals or fruit, etc. In addition, although a plurality of cavities 113 are shown, the mould may include a single cavity to manufacture a single chocolate piece. Top mould piece 102 also includes a plurality of magnets 120 disposed therein. Magnets 120 are preferably located underneath top wall 112 as shown in greater detail in FIG. 3. The same number of magnets is preferably used in the top mould piece 102 as in the bottom mould piece 101. In addition, magnets 120 of top mould piece 102 are preferably aligned with magnets 110 of bottom mould piece 101 to keep the moulds 101 and 102 connected when assembled, as will be later described with reference to FIG. 3.

Mould assembly 100 optionally further comprises transfer sheet 103. Transfer sheet 103 may contain a design printed thereon with edible ink on its top surface 131. Alternatively, transferسheet 103 may contain a raised design embossed on its top surface 131. During production, the printed design or the raised design will be transferred to the chocolate poured into the mould assembly 100. Transfer sheet 103 is preferably dimensioned to fit on top of bottom mould piece 101. Transfer sheet 103 also preferably contains cut corners 135 that correspond to the upper edge of corner walls 105 of bottom mould 101, for easy removal of the transfer sheet 103 from the top mould piece 102 during disassembly.

In use, mould assembly 100 is assembled before it is fed to the production line using the automated destacker of the present invention. First, bottom mould piece 101 is lined with the transfer sheet 103, with the top surface 131 containing the transfer design facing up. Then top mould piece 102 is placed on top, such that the bottom of each cavity 113 reveals the transfer sheet 103 containing the transfer design.

Figure 2:
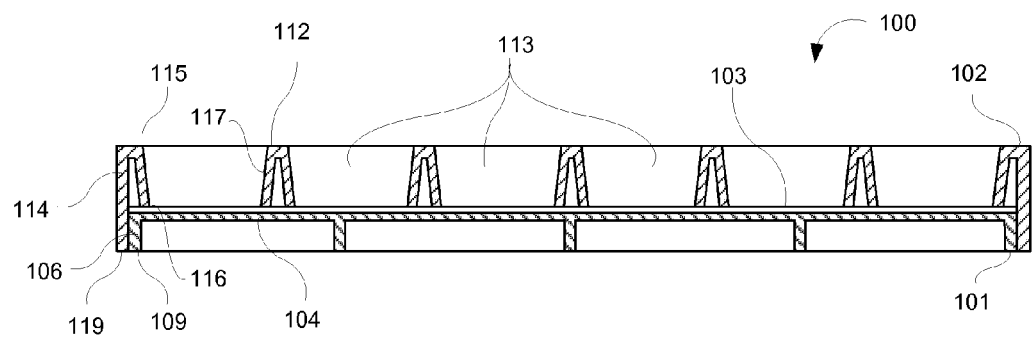
FIG. 2 is a cross-sectional view of the assembled mould assembly shown in FIG. 1, taken along plane 2.

FIG. 2 shows a cross-sectional view of the assembled mould assembly 100 shown in FIG. 1 taken along plane 2. When mould assembly 100 is assembled, bottom mould piece 101 is nested within top mould piece 102 such that bottom edge 109 of bottom mould piece 101 is aligned with bottom edge 119 of top mould piece 102. As such, the diameter of bottom mould piece 101 is slightly smaller than the diameter of top mould piece 102, such that side wall 106 of bottom mould assembly 101 fits within side wall 114 of top mould piece 102. In addition, transfer sheet 103 is tightly sandwiched between bottom mould piece 101 and top mould piece 102. As a result, substantially no gap is present between the transfer sheet 103 and bottom ends 116 of cavities 113 included in the top mould piece 102.

Figure 3:
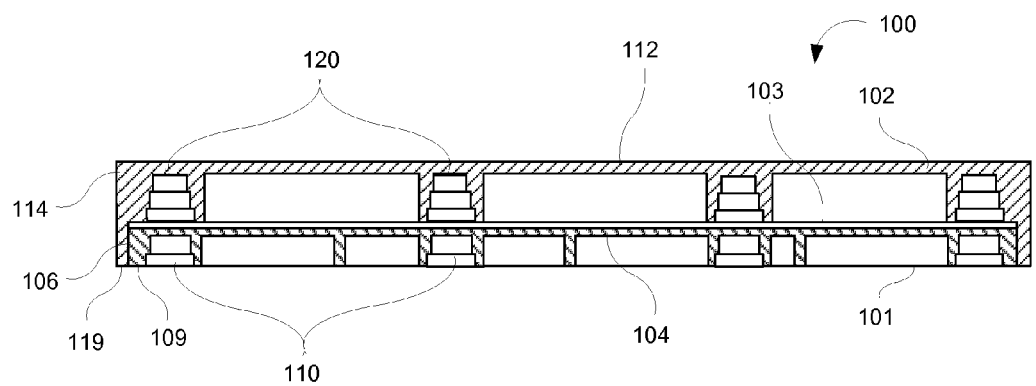
FIG. 3 is a cross-sectional view of the assembled mould assembly shown in FIG. 1, taken along plane 3.

FIG. 3 shows a cross-sectional view of the assembled mould assembly 100 shown in FIG. 1 taken along plane 3. As illustrated, bottom mould piece 101 and top mould piece 102 are tightly held together using magnets 110 and 120. Magnets 110 of bottom mould piece 101 are located below the top wall 104 of bottom mould piece 101. Similarly, magnets 120 of top mould piece 102 are located below top wall 112. Magnets 110 of bottom mould piece 101 are aligned with magnets 120 of top mould piece 101 to tightly secure the mould pieces 101 and 102 together.

After mould assembly 100 is assembled, it may be stacked on top of other mould assemblies by hand or by automated process to be later fed to the production line using the automated destacker of the present invention. At the production line, tempered chocolate is poured into the cavities 113 (shown in FIG. 2). The design on the optional transfer sheet 103 is then transferred to the chocolate pieces. At the end of the production line, after the chocolate pieces are fully formed and cooled off, mould assembly 100 is turned upside down and shaken to release the chocolate pieces therefrom, revealing the transferred design on the top of the chocolates if one has been placed there.

Figure 4:
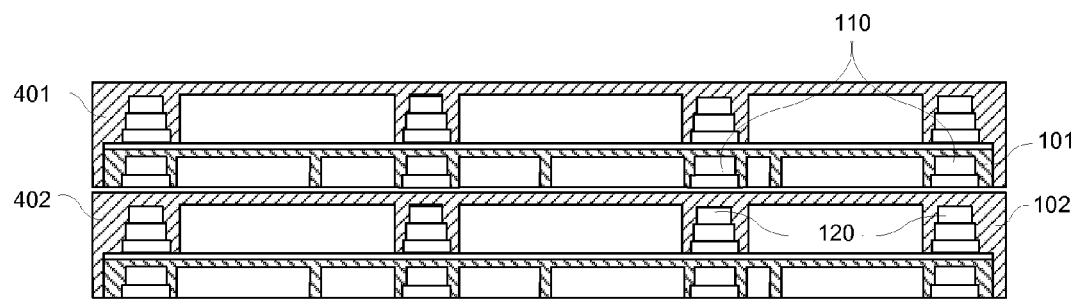
FIG. 4 is a cross-sectional view of two mould assemblies stacked on top of each other.

Referring now to FIG. 4, there is shown a cross-sectional view of two mould assemblies, or moulds, 401 and 402 stacked on top of each other. Moulds 401 and 402 are each identical to mould assembly 100 shown in FIGS. 1-3. When moulds 401 and 402 are vertically stacked before being fed into the destacker of the present invention, magnets 110 located in the bottom piece 101 of mould 401 align to magnets 120 located in the top piece 102 of mould 402, thereby magnetizing and holding moulds 401 and 402 together. As described below, the destacker of the present invention automatically separates vertically stacked and magnetized moulds, such as moulds 401 and 402 shown in FIG. 4.

Referring back to FIG. 1, to cooperate with the destacker of the present invention, mould assembly 100 is provided with slanted notches 140 located at each of its top corner—extending from horizontal top wall 112 at an angle to corners 118 formed between vertical side walls 114. As such, slanted notches 140 are preferably triangular in shape. Slanted notches 140 can be formed by cutting the top corners of the mould assembly 100 at an angle or they may be integrally pre-formed when the mould assembly is manufactured. In a preferred embodiment of the present invention, four slanted notches 140 are provided, located at each corner 118 of the mould assembly 100. However, the present invention may operate with three, two, or a single slanted notch 140 without departing from the scope of the present invention. For example, two diagonally spaced slanted notches 140 may be used.

Figure 5:
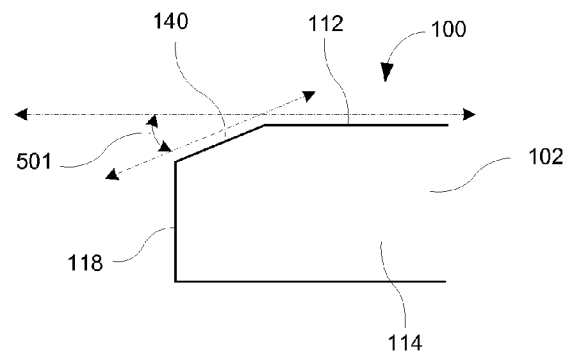
FIG. 5 is a partial cross-sectional view of the assembled mould assembly shown in FIG. 1, taken along plane 5.

FIG. 5 shows a partial cross-sectional view of the assembled mould assembly 100 of FIG. 1 taken along diagonal plane 5. As shown, slanted notch 140 extends from top wall 112 of top mould piece 102 down towards corner 118 formed between two side walls 114. Top wall 112 and slanted notch 140 form angle 501. Angle 501 can range between about 5 degrees to about 45 degrees, more preferably between about 10 degrees to about 40 degrees, and more preferably between about 12.5 degrees and about 32.5 degrees. In a preferred embodiment of the present invention, angle 501 is about 22.5 degrees.

Figure 6:
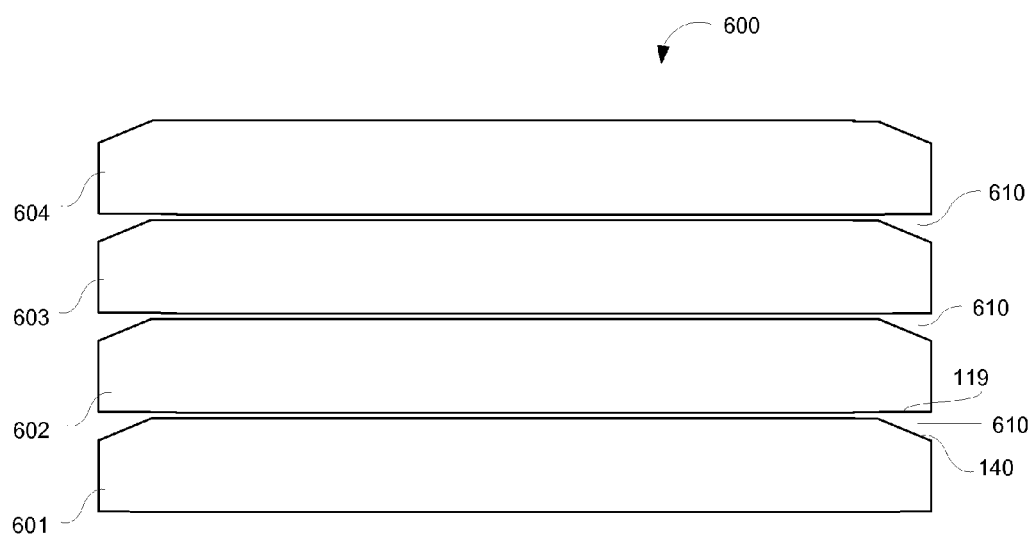
FIG. 6 is a side view of a stack of mould assemblies.

Referring now to FIG. 6, which illustrates a side view of a vertical stack 600 of mould assemblies, or moulds, 601, 602, 603, and 604. Moulds 601 through 604 are identical to mould assembly 100. When the moulds are stacked, gaps 610 are formed between slanted notch 140 of mould 601 and the bottom edge 119 of mould 602. Gaps 610 are used by the mould destacker of the present invention to separate the moulds 601, 602, 603, and 604 from each other as will be later described.

Figure 7A:
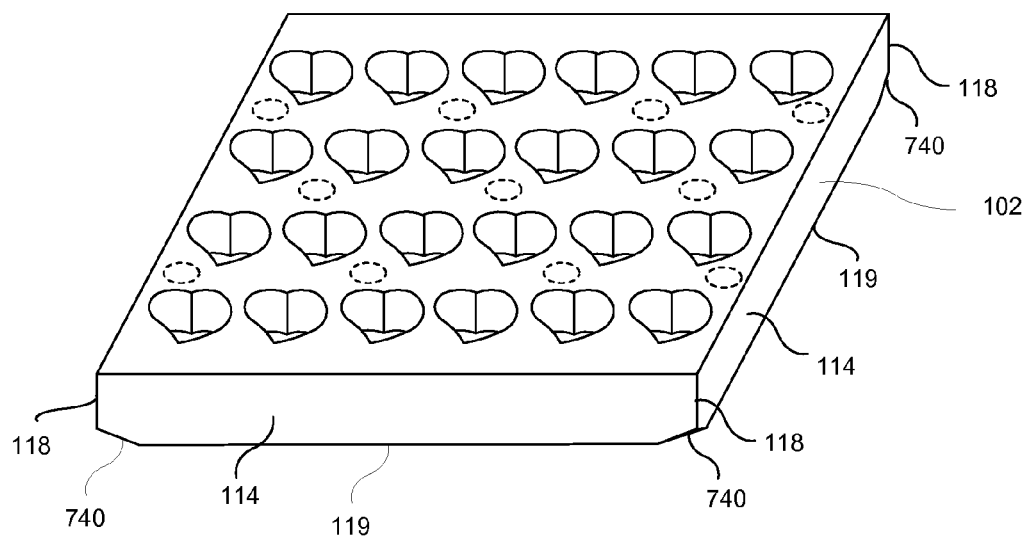
FIG. 7a is a perspective view of an alternative embodiment of the mould assembly.
Figure 7B:
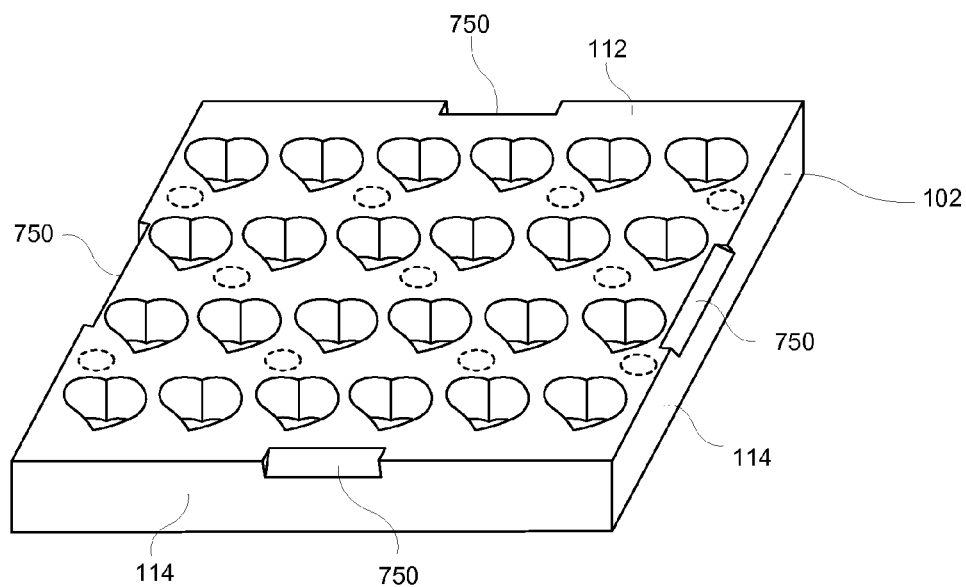
FIG. 7b is a perspective view of another alternative embodiment of the mould assembly.

Although the present invention is described with slanted notches 140 disposed at the top corners of the mould assembly 100, it should be understood that the slanted notches may be disposed at the bottom corners of the mould assembly 100. FIGS. 7a-7b each show a perspective view of alternative embodiments of the mould assembly. As illustrated in FIG. 7a, slanted notches 740 may be disposed at the bottom corners of the top mould piece 102—extending at an angle from bottom edges 119 toward corners 118 formed between side walls 114. In an alternative embodiment, slanted notches 740 may be provided anywhere along side walls 114. As illustrated in FIG. 7b, slanted notches 750 may be included in the middle of side wall 114, extending at an angle from top wall 112 down to side wall 114. In another embodiment, slanted notches may be included in the middle of side walls 114, extending at an angle from side walls 114, down and inwards toward the bottom edges 119 (not shown).

Figure 8A:
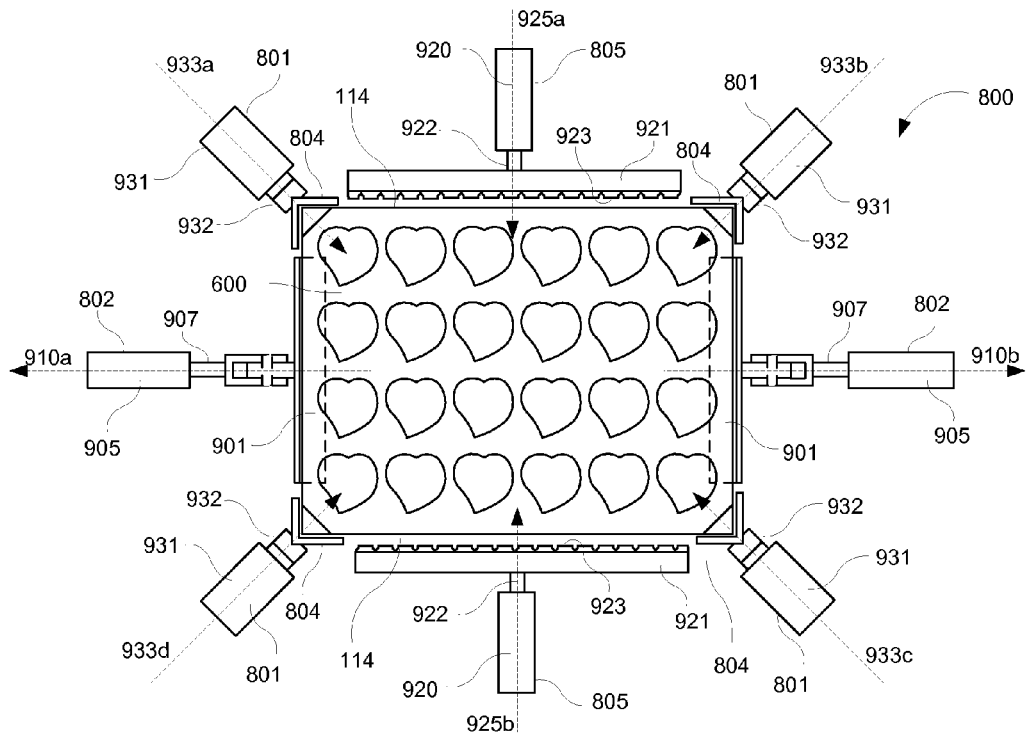
FIG. 8a is an elevational top view of a destacker in an initial operational state.
Figure 9A:
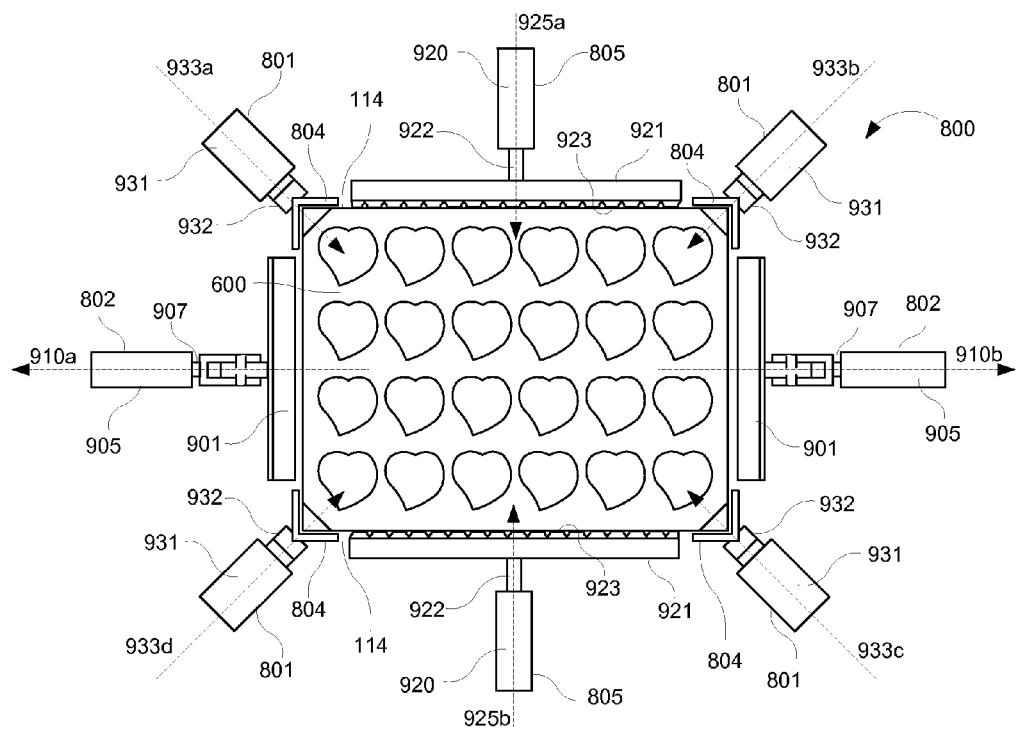
FIG. 9a is an elevational top view of the destacker in a second operational state.
Figure 9B:
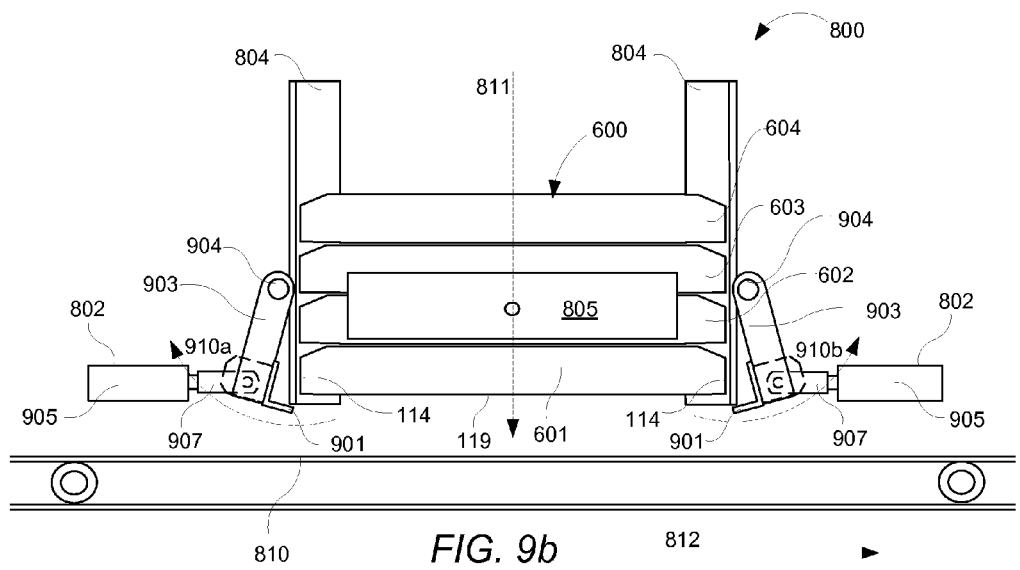
FIG. 9b is a partial cross-sectional view of the destacker in the second operational state showing the position of the mould carrier components of the destacker.
Figure 10A:
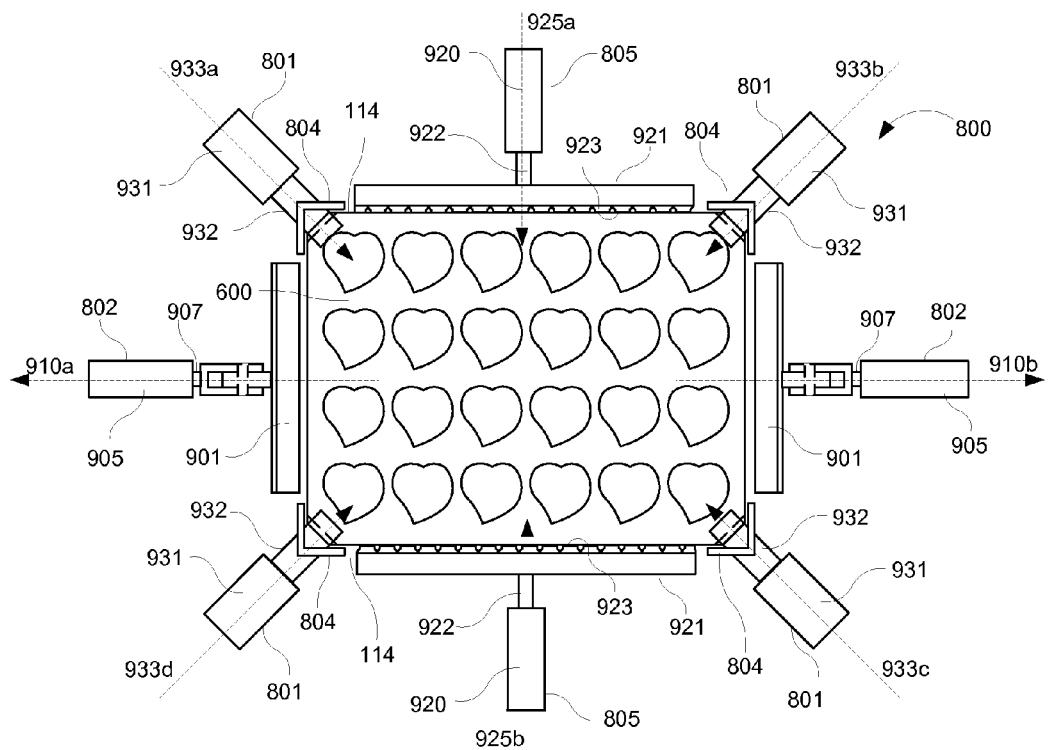
FIG. 10a is an elevational top view of the destacker in a third operational state.
Figure 10B:
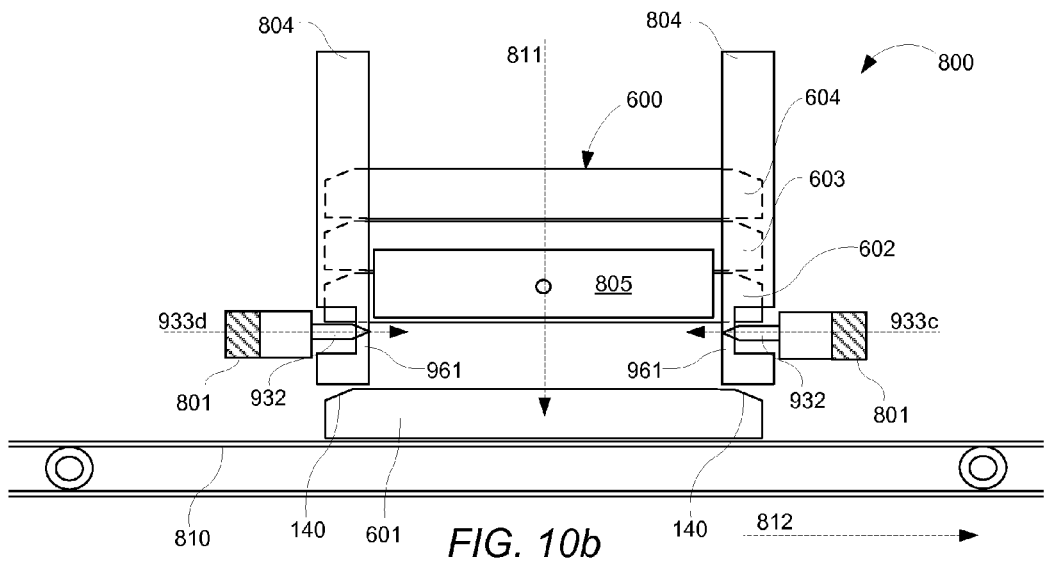
FIG. 10b is a partial cross-sectional view of the destacker in the third operational state showing the position of the hammer components of the destacker.
Figure 11:
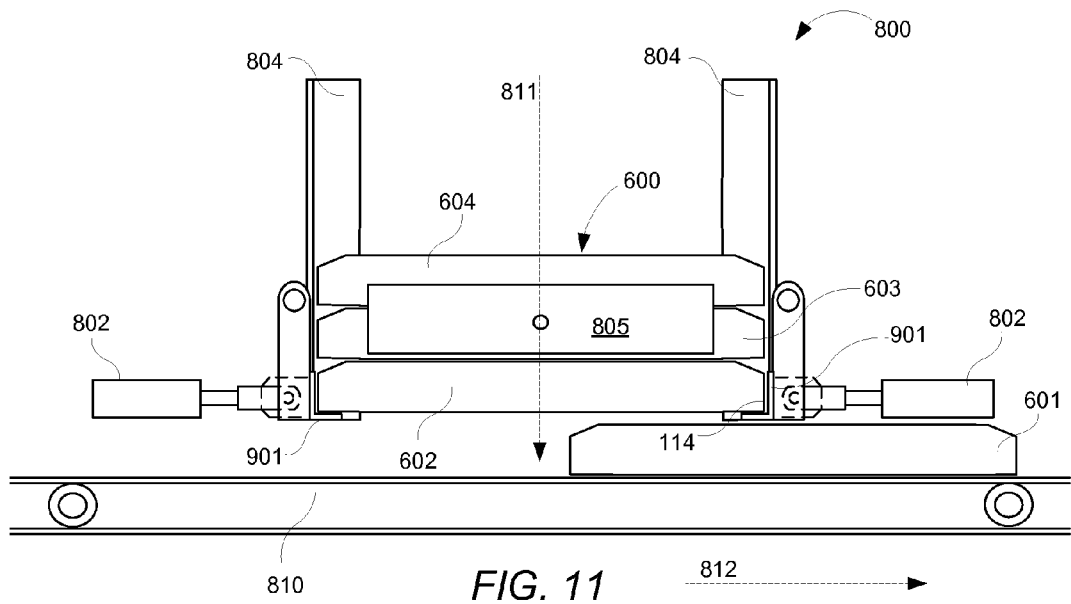
FIG. 11 is a partial cross-sectional view of the destacker in the final operational state showing the position of the mould carrier components of the destacker.

FIGS. 8a-13c illustrate the operation of the mould destacker 800 according to the present invention. Mould destacker 800 is used to destack a stack of mould assemblies 100, such as stack 600 shown in FIG. 6. In particular, FIGS. 8a, 9a, and 10a show elevational top views of destacker 800 in various operational positions. FIGS. 8b and 8c show partial cross-sectional views of destacker 800 illustrated in FIG. 8a; FIG. 9b shows partial cross-sectional views of destacker 800 illustrated in FIG. 9a; and FIG. 10b shows partial cross-sectional views of destacker 800 illustrated in FIG. 10a. FIG. 11 shows partial cross-sectional views of destacker 800 in the final operational position. FIGS. 12a-13c illustrate the various individual components of the destacker 800 and their operation.

Figure 8B:
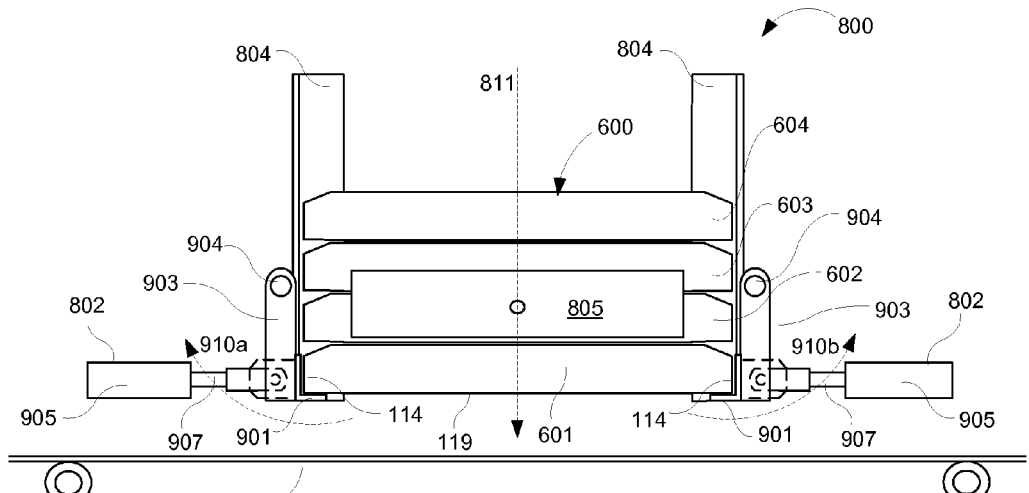
FIG. 8b is a partial cross-sectional view of the destacker in the initial operational state showing the position of the mould carrier components of the destacker.
Figure 8C:
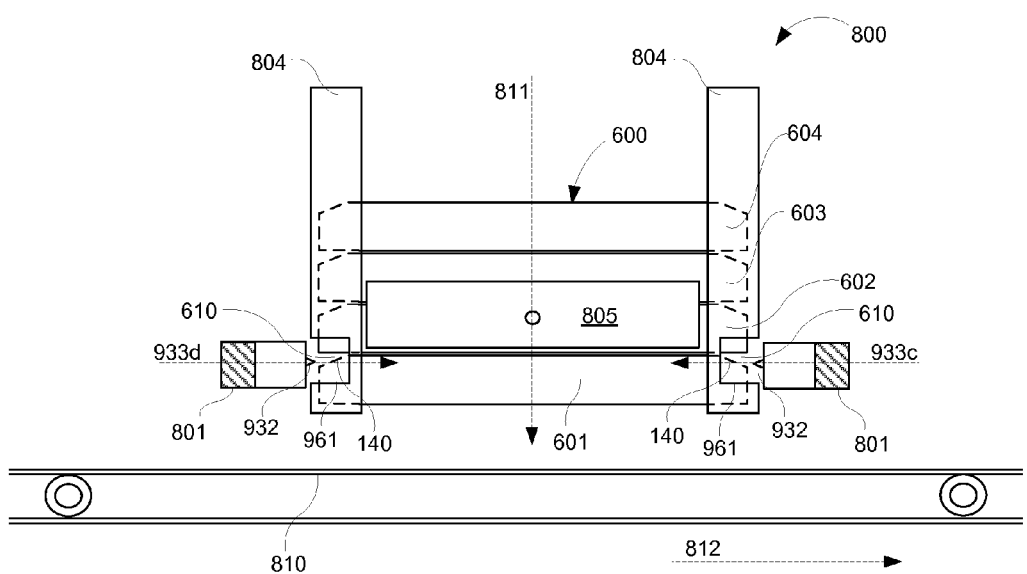
FIG. 8c is a partial cross-sectional view of the destacker in the initial operational state showing the position of the hammer components of the destacker.

Referring first to FIGS. 8a-8c, mould destacker 800 is located above a conventional conveyor 810. Mould destacker 800 comprises a frame for receiving a stack of moulds 600 formed by four vertical tracks 804 located at the four corners of the destacker 800. Tracks 804 are preferably L-shaped and dimensioned and situated to receive a stack of moulds 600. The destacker 800 is loaded by inserting a stack of moulds 600 into its top end, in between tracks 804. Destacker 800 may be loaded by hand, or automatically by the production line. Tracks 804 guide the stack of moulds 600 in a downward direction 811 when the destacker 800 is in operation. When the bottommost mould 601 is separated from the stack of moulds 600 by the destacker 800, it drops down by the force of gravity in direction 811 onto the conveyor 810. Conveyor 810 transports mould 601 in direction 812, as is well known in the art, to a variety of stations in the production line where the moulds are filled with tempered chocolate and where other processes are optionally applied.

Figure 12A:
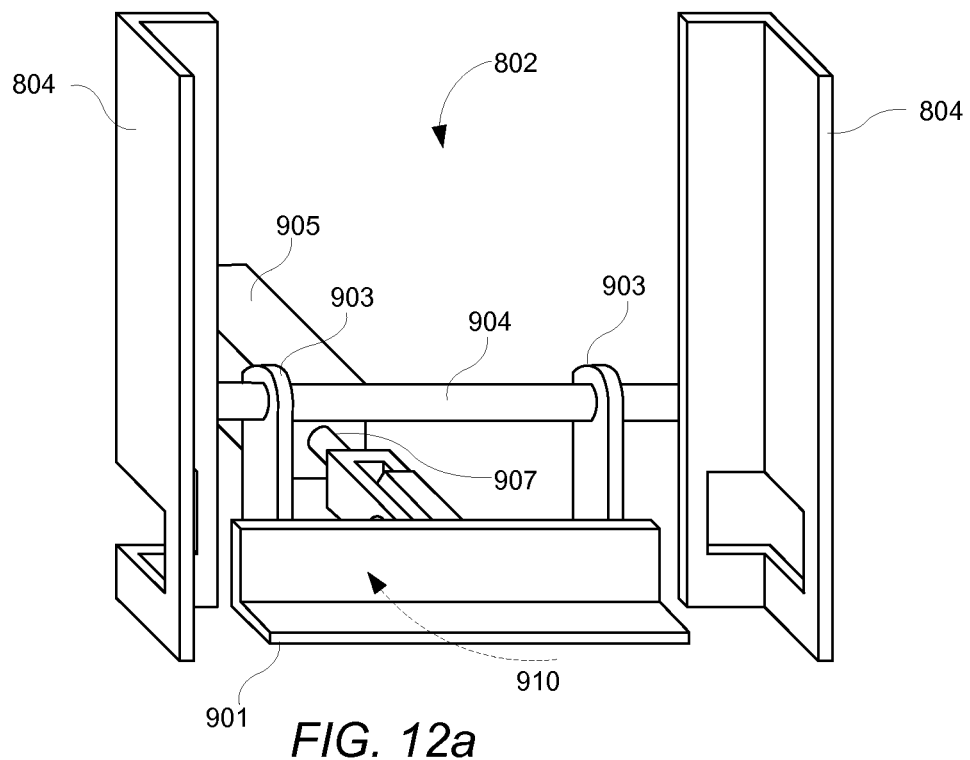
FIG. 12a is a perspective view of a mould carrier component of the destacker.

Destacker 800 preferably further comprises two mould carriers 802 located at two opposite sides of the destacker 800. Mould carriers 802 are used to retain the bottommost mould 601, thereby preventing it from moving in downward direction 811 and dropping onto the conveyor 810. As a result, the entire stack of moulds 600 is held by the mould carriers 802. Each mould carrier 802 comprises an L-shaped bracket 901, comprising of interconnected horizontal and vertical walls facilitated to contact side wall 114 and bottom edge 119 of bottommost mould 601. FIG. 12a shows a perspective view of a mould carrier 802 in greater detail. As illustrated, mould carrier 802 preferably comprises two pivot shafts 903 connected at their lower end to the rear of the L-shaped bracket 901 and at their upper end to a pivot axle 904. Pivot axle 904 may be rotatably secured at its two ends to two adjacent tracks 804 of mould stacker 800. Alternatively, pivot axle 904 may be connected to an outer frame of the destacker 800 using brackets and nuts and bolts (not shown). Each mould carrier 802 is preferably operated using a pneumatic motor 905 that drives piston 907 at a preferred pressure of 6 bars. Piston 907 is pivotly connected to L-shaped bracket 901. As such, pneumatic motor 905 drives the L-shaped bracket 901 to rotate about the pivot axle 904 along axial direction 910. In a preferred embodiment, each mould carrier 802 pivots rearward in axial direction 910 with respect to the mould destacker 800 or stack of moulds 600 from a retaining position shown in FIGS. 8a-8b to a retracted position shown in FIGS. 9a-9b. As shown in FIGS. 9a-9b, the two mould carriers 802 pivot to the retracted position in rearward axial directions 910a and 910b, away from each other. In the retracted position, mould carriers 802 release the stack of moulds 600. Preferably, mold carriers 802 pivot about 45 degrees with respect to the mould destacker 800 or stack of moulds 600 from the retaining position to the retracted position.

As shown in FIGS. 8a-8b, mould destacker 800 further comprises two mould lockers 805 located at two opposite sides of the destacker 800. In a preferred embodiment, each mould locker 805 comprises a bracket 921 comprising a vertical wall operated by a pneumatic motor 920. In each mould locker 805, the pneumatic motor 920 drives a piston 922 at a preferred pressure of 6 bars. Pistons 922 in turn move the brackets 921 of lockers 805 forward in directions 925a and 925b with respect to the mould destacker 800 or stack of moulds 600. As such, pneumatic motors 920 move the brackets 921 toward each other in directions 925a and 925b from a retracted position shown in FIG. 8a to a locking position shown in FIG. 9a. In the locking position, lockers 805 come into contact with two opposite side walls 114 of moulds in stack of mould 600, thereby sandwiching and locking the moulds therebetween. Mould lockers 805 are preferably located perpendicularly with respect to the mould carriers 802. As such, the operating directions 910a and 910b of mould carriers 802 are perpendicular to the operating directions 925a and 925b of the mould lockers 805. As shown in FIG. 8b, mould lockers 805 are also located above mould carriers 802 such that mould lockers 805 can lock and hold mould assemblies 602, 603, and 604 located above the bottommost mould 601. As such, the bottommost mould 601 is not locked and held by mould lockers 805.

Figure 12B:
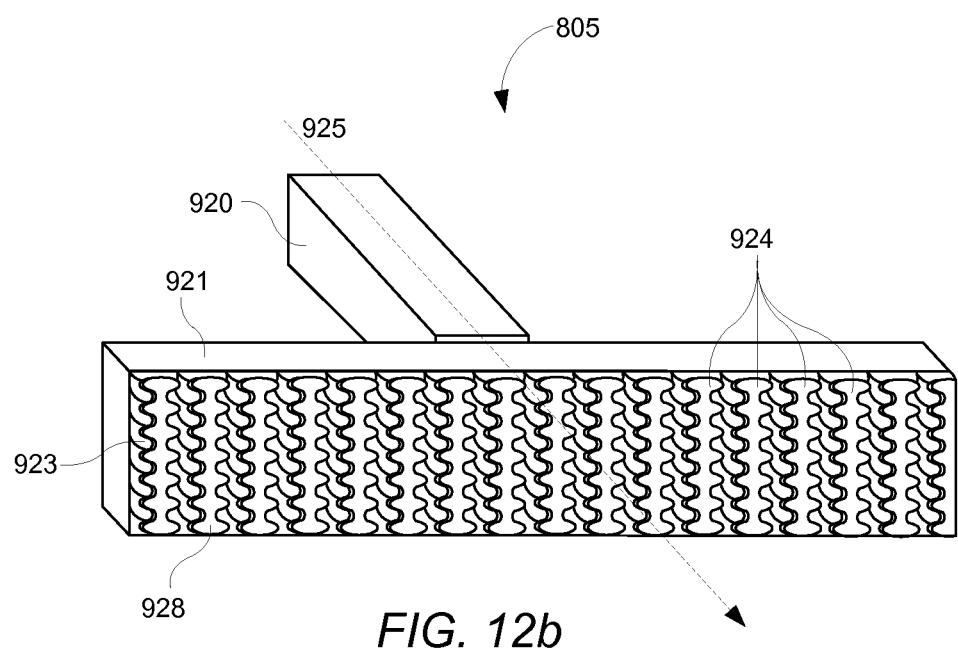
FIG. 12b is a perspective view of a mould locker component of the destacker.

FIG. 12b shows a perspective view of the mould locker 805 in greater detail. Each mould locker 805 further comprises a layer of gripping material or grip 923. When mould lockers 805 are in a locking position, grip 923 prevents moulds 602, 603, and 604 in stack of moulds 600 from slipping down due to their weight. Grip 923 is preferably made of material that provides surface adherence and resistance. In a preferred embodiment, grip 923 is made of an elastomeric material, such as rubber, and more preferably nitrile rubber. Grip 923 may be also made from polyolefin, silicone, or similar materials. Grip 923 further preferably contains a tread like surface 928 formed with a pattern of spaced apart textured protrusions 924. Tread like surface 928 provides further resistance and traction to prevent moulds 602, 603, and 604 from sliding against grip 923. A preferred tread-like material is available through Ammeraal Beltech of Heerhugowaard, Netherlands, under the trademark ZipLink®.

As shown in FIGS. 8a and 8c, mould destacker 800 further comprises four hammers 801 located at each corner of the mould destacker 800. In the preferred embodiment of the present invention, four hammers are utilized. However, the present invention may also operate using one, two, or three hammers. In one embodiment of the present invention, mould destacker 800 may operate using two hammers 801 diagonally disposed across of each other, for example at diagonal directions 933a and 933c (or 933b and 933d). In a preferred embodiment, each hammer 801 comprises a pneumatic motor 931 that drives a blade 932 at a preferred pressure of 6 bars. Blades 932 are driven diagonally towards each other in forward directions 933a, 933b, 933c, and 933d with respect to the mould destacker 800 or stack of moulds 600. As such, pneumatic motors 931 drive blades 932 in directions 933a, 933b, 933c, and 933d from a retracted position shown in FIGS. 8a and 8c to an extracted position shown in FIGS. 10a-10b. As shown in FIGS. 8c and 10b, blades 932 extract to cooperate with gaps 610 formed by slanted notches 140 of the mould assemblies to separate the bottommost mould 601 from mould 602 in the stack of moulds 600 as will be later described. In a preferred embodiment, blades 932 are made of stainless steel. However, they may be made of other materials known for making blades.

Figure 12C:
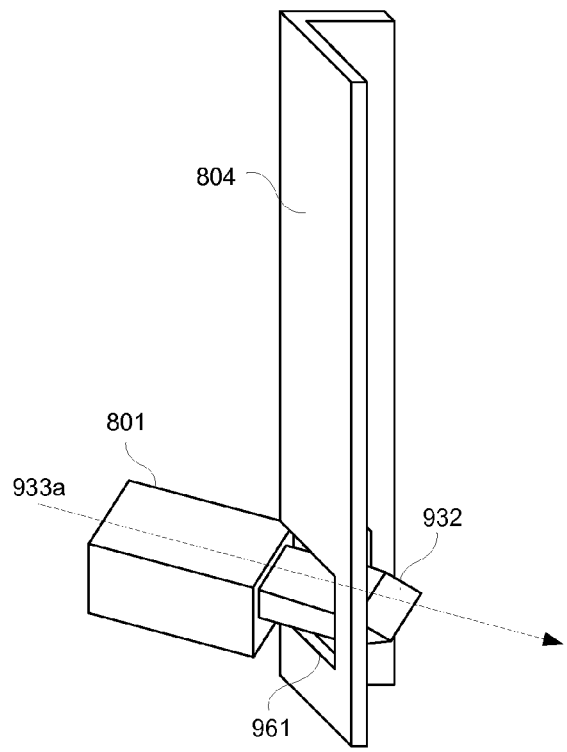
FIG. 12c is a perspective view of a hammer and track components of the destacker.

FIG. 12c shows a perspective view of a hammer 801 and track 804 in greater detail. As shown in FIG. 12c, as well as FIGS. 8a and 8c, each hammer 801 is positioned outside each track 804 at a 45 degree angle with respect to each track 804. Each track 804 is provided with a cutout 961 dimensioned to receive the extracted blades 932 of hammers 801. In addition, as shown in FIG. 8c, each hammer 801 is positioned such that blades 932 are aligned with gaps 610 formed by slanted notches 140 of bottommost mould 601.

In one embodiment, hammers 801 may be disposed on movable vertical tracks (not shown) that allow hammers 801 to be vertically adjusted to enable destacker 800 to receive moulds of different heights. In such configuration, tracks 804 may be provided with taller cutouts 961, or a plurality of vertically disposed cutouts, so as to received blades 932 at various height positions. As such, hammers 801 may be vertically adjusted to align blades 932 with gaps 610 right above the bottommost mould.

Figure 12D:
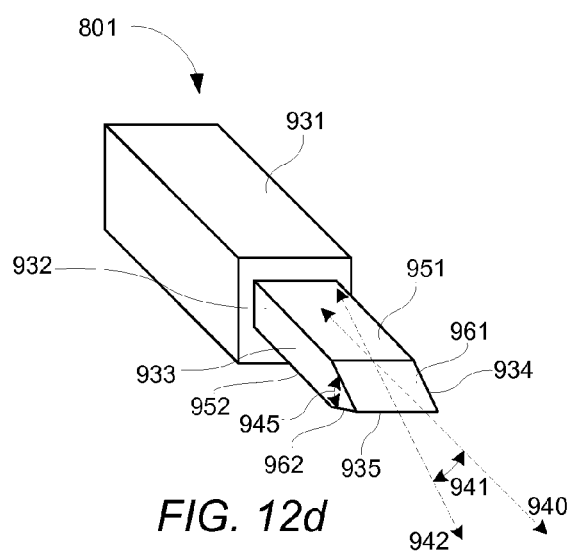
FIG. 12d is a perspective view of a blade of the hammer component of the destacker.

FIG. 12d shows a perspective view of hammer 801 in greater detail. Blade 932 preferably comprises horizontal member 933 comprising parallel top and bottom walls 951 and 952 extending along horizontal direction 940. Blade 932 also comprises tip 934 comprising top and bottom walls 961 and 962 extending at an angle from top and bottom walls 951 and 952 of the horizontal member 933, respectively. Top and bottom walls 961 and 962 of tip 934 meet at an edge 935. As such, tip 934 tapers from a thicker end to a thinner end at edge 935. As illustrated, the tip's top wall 961 extends along a declined direction 942 at angle 941 from horizontal direction 940 of horizontal member's top wall 951 to edge 935. Similarly, the tip's bottom wall 962 extends in an inclined direction at the same angle as angle 941 (not shown) from horizontal member's bottom wall 952 to edge 935. In a preferred embodiment, angle 941 of the blade tip 934 is shaped to fit angle 501 of the slanted notch 140 of mould assembly 100 shown in FIG. 5, in a lock-and-key fashion. Angle 941 can range between about 5 degrees to about 45 degrees, more preferably between about 10 degrees to about 40 degrees, and even more preferably between about 12.5 degrees and about 32.5 degrees. In a preferred embodiment of the present invention angle 941 is about 22.5 degrees. As such, in a preferred embodiment, the blade tip's top and bottom walls 961 and 962 are angled with respect to each other at angle 945, which is about 45 degrees. In a preferred embodiment, blade tip 934 is symmetrical as shown in FIG. 12d. However, other configurations of the blade 932 may be employed without departing from the scope of the present invention. For example, blade 932 may comprise bottom tip wall 962 that extends at angle 941 from bottom wall 952 to the top wall 951 of horizontal member 933 (not shown). In such configuration, top tip wall 961 is not formed.

In a preferred embodiment, pneumatic motors 905, 920, and 931 of mould carriers 802, mould lockers 805, and hammers 801, respectively, are pneumatically connected to a compressed-air source via pneumatic valves (not shown). In a preferred embodiment, pneumatic motors 905, 920, and 931 operate at a preferred pressure of 6 bars. However, the pressure of the pneumatic motors 905, 920, and 931 may range between 1.2 bars to 10 bars, depending on the type of articles that are being dispensed. The pneumatic valves may be electrically controlled by a relay logic circuit, or alternatively, by a programmable controller (not shown), as is known in the art. The relay logic circuit, or programmable controller, may synchronize the mould carriers 802, mould lockers 805, and hammers 801 with the speed of the production line. In a preferred embodiment, the speed of the production line is 13 times/minute for making chocolate. However, the speed of the production line could run as high as 22 times/minute, or higher for different types of applications. The relay logic circuit, or programmable controller, may further synchronize the mould carriers 802, mould lockers 805, and hammers 801 with respect to each other in accordance with the programmed control sequence described below.

The destacker of the present invention has been described as being operated by pneumatic motors 905, 920, and 931. However, other motors known in the art may be used without departing from the scope of the present invention. For example, electric motors, servo motors, or hydraulic motors may also be used.

The components of the mould destacker 800 preferably operate at a predetermined control sequence. FIGS. 8a-8c illustrate the initial operational state of the destacker 800. In the initial state, pistons 907 of mould carriers 802 are extracted such that the mould carriers 802 are in a retaining position. As such, in the initial operational state, mould carriers 802 retain the bottommost mould 601, and thereby the stack of moulds 600, to prevent the stack of moulds 600 from dropping in a downward direction 811 due to the force of gravity or otherwise. On the other hand, pistons 922 of the mould lockers 805 are retracted such the mould lockers 805 are in a retracted position. As such, mould lockers 805 do not contact and lock the stack of moulds 600. Blades 932 of hammers 801 are also retracted such that the hammers are in a retracted position and are not in cooperation with the stack of moulds 600. In the initial operational state, the destacker 800 may be loaded with the stack of moulds 600, or additional moulds may be added at that time.

FIGS. 9a-9b illustrate the second operational state of the destacker 800. While hammers 801 remain in the retracted position, mould lockers 805 move in directions 925a and 925b toward each other, from a retracted position shown in FIG. 8a to a locking position shown in FIG. 9a to lock mould 602 and moulds located above it, including moulds 603 and 604, in place. As such, moulds 602, 603 and 604 are locked in place and are prevented from moving in a downward direction 811. After moulds 602, 603, and 604 are locked, mould carriers 802 pivot in axial directions 910a and 910b away from each other, from retaining position shown in FIGS. 8a-8b to a retracted position shown in FIGS. 9a-9b to release the bottommost mould 601. Because mould lockers 805 hold moulds 602, 603, and 604, the stack of moulds 600 remains in place. Although the bottommost mould 601 is no longer retained by the mould carriers 802, and it is also not retained by mould lockers 805, it remains connected to mould 602 directly above it and does not drop down in downward direction 811. This is because the bottommost mould 601 is connected to mould 602 via magnets 110 and 120, as illustrated in FIG. 4.

FIGS. 10a-10b illustrate the third operational state of the destacker 800. At this state, mould carriers 802 remain in retracted position and mould lockers 805 remain in locking position. Blades 932 of hammers 801 extract in directions 933a-933d, respectively, toward each other from a retracted position shown in FIGS. 8a and 8c to an extracted position shown in FIGS. 10a and 10b. As blades 932 are extracted, they enter the cutouts 961 formed in tracks 804 and then enter gaps 610 formed by slanted notches 140 of bottommost mould 601 (as further described below with reference to FIGS. 13a-13c). As a result, the bottommost mould 601 separates from mould 602 and drops down in a downward direction 811 via the force of gravity onto conveyor 810. Conveyor 810 transports mould 601 in direction 812 to a variety of stations in the production line where the mould 601 is filled with tempered chocolate and where other processes are optionally applied in the assembly line. As such, the space right underneath the destacker 800 is cleared to receive the next mould 602.

Figure 13A:
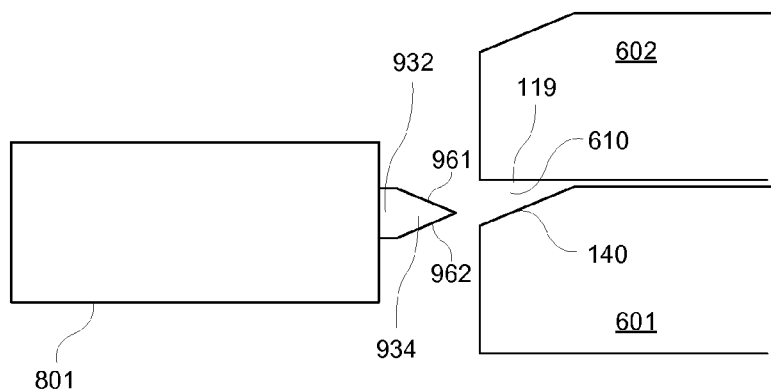
FIG. 13a is a side view of the blade of the hammer in a fully retracted position.
Figure 13B:
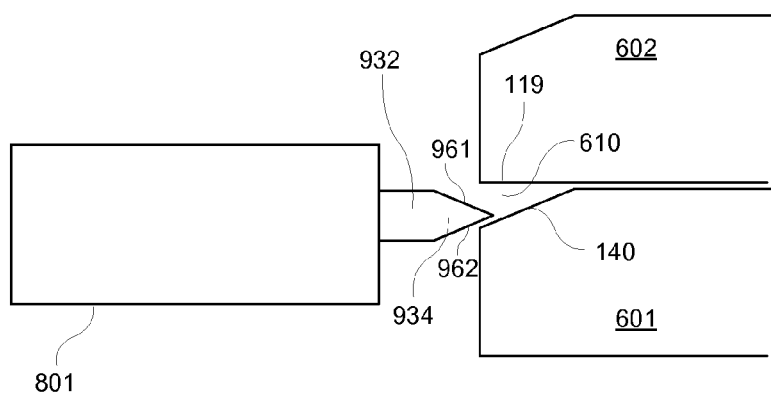
FIG. 13b is a side view of the blade of the hammer in a partially extracted position.
Figure 13C:
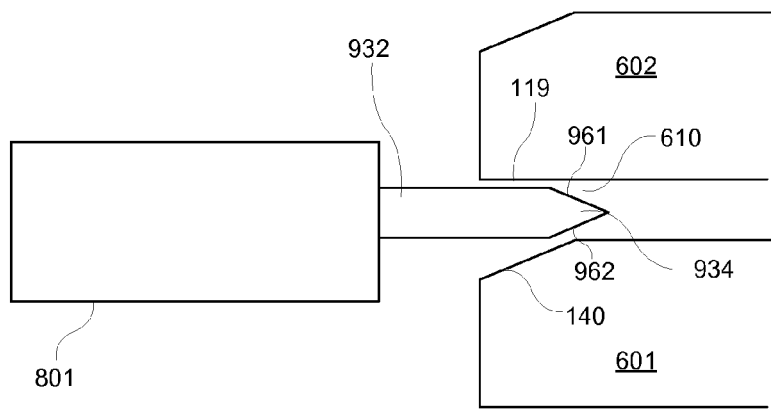
FIG. 13c is a side view of the blade of the hammer in a fully extracted position.

FIGS. 13a-13c, illustrate in greater detail the operation of hammers 801 to separate mould 601 from mould 602. In FIG. 13a, blade 932 is fully retracted and is aligned with gap 610 formed between slanted notch 140 of mould 601 and bottom edge 119 of mould 602. As the blade 932 begins to extract, as in FIG. 13b, it enters gap 610 and the bottom wall 962 of tip 934 meets slanted notch 140 of mould 601 in a lock-key configuration. As such, in a preferred embodiment of the present invention, bottom wall 962 is slanted at the same angle as slanted notch 140 of mould 601. Finally, as shown in FIG. 13c, when the blade 932 is fully extracted, bottom wall 962 of blade 932 slides further between slanted notch 140 of mould 601 and bottom edge 119 of mould 602. As a result, mould 601 is pried from mould 602. Since four hammers 801 are used, all four gaps 610 between moulds 601 and 602 are entered by blades 932 causing mould 601 to evenly separate from mould 602. As previously indicated, however, two diagonally spaced hammers 801 may also be used. In that scenario, two diagonally spaced blades 932 would enter two diagonally spaced gaps 610 between moulds 601 and 602.

After mould 601 separates from mould 602, and thereby the stack of moulds 600, destacker 800 is returned to the initial position shown in FIGS. 8a-8c. In particular, first, blades 932 of hammers 801 retract from an extracted position shown in FIGS. 10a-10b to retracted position shown in FIGS. 8a and 8c. Next, mould carriers 802 pivot from retracted position shown in FIGS. 9a-9b to a retaining position shown in FIGS. 8a-8b. Lastly, mould lockers 805 move from a locking position shown in FIG. 9a to a retracted position shown in FIG. 8a. As such, moulds 602, 603, and 604 are released from mould lockers 805 and drop down in direction 811 to be retained by mould carriers 802 as shown in FIG. 11. The process then repeats to separate mould 602 from the stack of moulds including moulds 603 and 604. The process repeats until all the moulds in stack 600 are destacked onto the conveyor 810.

Although mould destacker 800 was described using mould carriers 802 and mould lockers 805, it may be used using other devices to retain and feed the stack of moulds 600 in a downward direction 811.

It should be understood that this invention is not limited to the disclosed features and other similar method, system, and apparatus may be utilized without departing from the spirit and the scope of the invention.

While the invention has been described with reference to the preferred embodiment and alternative embodiments, which embodiments have been set forth in considerable detail for the purposes of making a complete disclosure of the invention, such embodiments are merely exemplary and are not intended to be limiting or represent an exhaustive enumeration of all aspects of the invention. The scope of the invention, therefore, shall be defined solely by the following claims. Further, it will be apparent to those of skill in the art that numerous changes may be made in such details without departing from the spirit and the principles of the invention. It should be appreciated that the invention is capable of being embodied in other forms without departing from its essential characteristics.

The invention claimed is:

1. A destacker for destacking a plurality of stacked articles, each article comprising at least one slanted notch that forms a gap between a first article located at the bottom of the plurality of stacked articles and a second article located above the first article, the destacker comprising:
   a blade that moves from a retracted position to an extracted position and comprising a horizontal member and a tip extending therefrom, the tip comprising a slanted wall extending from the horizontal member to an edge, wherein at the extracted position, the tip engages the gap formed between the first and second articles to release the first article from the second article; and
   oppositely disposed pair of article lockers for locking the second article therebetween during a locking position and releasing the second article during a retracted position, wherein each of the pair of article lockers comprises a bracket including a vertical wall for retaining the at least one side wall of the second article in the locking position.

2. The destacker of claim 1, wherein said plurality of stacked articles comprises a plurality of stacked moulds.

3. The destacker of claim 1, wherein said plurality of stacked articles are interconnected via magnets.

4. The destacker of claim 1, wherein said at least one slanted notch extends at a first angle and wherein the slanted wall of the blade tip extends at a second angle, wherein the first angle is substantially equivalent to the second angle.

5. The destacker of claim 4, wherein at least one of said first angle and said second angle is in a range of about 5 degrees to about 45 degrees.

6. The destacker of claim 4, wherein at least one of said first angle and said second angle is about 22.5 degrees.

7. The destacker of claim 1, wherein each of said plurality of stacked articles comprises a top wall and four side walls that form four corners, and wherein each of said plurality of stacked articles comprises four slanted notches extending at a first angle from the top wall to each of said four corners.

8. The destacker of claim 1, wherein the blade is driven via a motor selected from the group consisting of an electric motor, a servo motor, a hydraulic motor, and a pneumatic motor.

9. The destacker of claim 1, wherein the destacker further comprises oppositely disposed pair of article carriers for retaining the first article during a retaining position and releasing the first article during a retracted position.

10. The destacker of claim 9, wherein when the pair of article carriers are in the retaining position, the blade is in the retracted position, and wherein when the pair of article carriers are in the retracted position, the blade is in the extracted position.

11. The destacker of claim 9, wherein each of the pair of article carriers comprises an article carrier bracket including a horizontal wall for retaining a bottom edge of the first article during the retaining position.

12. The destacker of claim 11, wherein each of the pair of article carriers comprises a pivot shaft for pivoting said bracket from the retaining position to the retracted position in which the horizontal wall of each of the article carriers releases the bottom edge of the first article.

13. The destacker of claim 12, wherein said pivot shaft comprises a first end and a second end, wherein the first end is connected to the article carrier bracket and at the second end is connected to a pivot axle.

14. The destacker of claim 1, wherein when the pair of article lockers are in the retracted position, the blade is in the retracted position, and wherein when the pair of article lockers are in the locking position, the blade is in the extracted position.

15. The destacker of claim 1, wherein said article locker bracket comprises a layer of gripping material.

16. The destacker of claim 15, wherein said layer of gripping material is selected from the group consisting of elastomeric material, rubber, nitrile rubber, polyolefin, silicone, or a combination thereof.

17. The destacker of claim 15, wherein the layer of gripping material comprises a plurality of textured protrusions.

18. The destacker of claim 1, wherein the destacker comprises a frame having four vertical tracks for receiving said plurality of stacked articles.

19. A destacker for destacking a plurality of stacked articles, each article comprises at least one slanted notch, the destacker comprising:

at least one blade that moves from a retracted position to an extracted position, the at least one blade comprising a horizontal member and a tip extending therefrom, the tip comprising a slanted wall extending from the horizontal member to an edge, wherein at the extracted position, the slanted wall of the at least one blade engages at least one slanted notch of an article located above a bottommost article of the plurality of stacked articles to release the bottommost article from the plurality of stacked articles; and oppositely disposed pair of article lockers for locking the article located above the bottommost article therebetween during a locking position and releasing the article located above the bottommost article during a retracted position, wherein each of the pair of article lockers comprises a bracket including a vertical wall for retaining at least one side wall of the article located above the bottommost article in the locking position.

20. A destacker for destacking a plurality of stacked articles, each article comprises at least one slanted notch, the destacker comprising:

at least one blade that moves from a retracted position to an extracted position, the at least one blade comprising a horizontal member and a tip extending therefrom, the tip comprising a slanted wall extending from the horizontal member to an edge, wherein at the extracted position, the slanted wall of the at least one blade engages at least one slanted notch formed in at least one of a bottommost article and an article located above the bottommost article of the plurality of stacked articles to release the bottommost article from the plurality of stacked articles; and oppositely disposed pair of article lockers for locking an article located above the bottommost article therebetween during a locking position and releasing the article located above the bottommost article during a retracted position, wherein each of the pair of article lockers comprises a bracket including a vertical wall for retaining at least one side wall of the article located above the bottommost article in the locking position.

\* \* \* \* \*